May 14, 1957   E. NANZ   2,791,834
BUTTER WASHING DEVICE
Filed March 15, 1954

United States Patent Office 2,791,834
Patented May 14, 1957

2,791,834

BUTTER WASHING DEVICE

Ernst Nanz, Stuttgart, Germany, assignor to Societe d'Equipements Industriels et Laitiers, Paris, France, a corporation of France, and Walter Joseph Sidler, Zollikon, near Zurich, Switzerland Application March 15, 1954, Serial No. 416,327

Claims priority, application France March 26, 1953

2 Claims. (Cl. 31—33)

The present invention concerns a method for washing butter at an intermediate stage of the treatment of the butter, which follows the outflow from the churning equipment.

It also concerns a particular working device, mounted on a squeezing and extracting apparatus.

It is known that, for stabilizing and preserving the taste of butter, the latter should generally be washed. In the usual discontinuous methods of manufacture, this washing operation takes place, most often, in a barrel or similar container, after formation of the butter grain and elimination of buttermilk, by adding water, which is eliminated in turn some time after or after a predetermined number of turns of the apparatus.

In this manner, the greatest part of albumen and undesirable milk sugar remnants are withdrawn from the butter grain before mixing operations.

On the other hand, in the continuous manufacture of butter, the washing operations are difficult. A continuous manufacturing installation comprises, for instance, a churning equipment consisting of a cylinder open at one end and closed at the other, around the axis of which rotate one or more shafts carrying churning paddles extending parallel to the generatrices of the cylinder surface, the cream to be churned being introduced at the closed end of the cylinder and the butter in grains and buttermilk issuing through the other end. This apparatus is followed by a squeezer extractor and a mixer. In an installation of this type, butter in grains obtained at the outlet from the churn, is treated in the squeezer-extractor, where it is separated from the major portion of the buttermilk and mixed.

One type of squeezer extractor generally used comprises an elongated casing divided into two compartments, in which are arranged two parallel helical screws having opposite motions. In the first compartment, the buttermilk after having been mixed, is squeezed and forced back into a tank provided at the base of this compartment. In the second compartment, the butter in grains is squeezed in turn and then forced through various perforated discs into an evacuation compartment.

The arrangement of the squeezer-extractor, as mentioned above, offers the drawback of carrying along, with the butter in compressed grains which travels from the first to the second compartment, a small proportion of buttermilk which is then kneaded with the butter. This is detrimental to the quality of butter.

It has already been proposed to wash the butter which arrives in the second compartment by spraying water onto the butter. The butter, however, which, at that stage, has already started being kneaded, before being subjected to the final mixing or kneading operations, offers an agglomerated grain which, under such conditions, does not make it possible to wash it efficiently. The water can no longer enter the butter nor fulfill its function, to wit the elimination of superfluous buttermilk containing albumen and butter sugar.

In order to be efficient, the washing operation should therefore, be effected on butter while the latter is in a condition of isolated grains. This is the object of the present invention.

The process which is an object of the present invention consists fundamentally in that the butter, previously agglomerated and squeezed for eliminating the major portion of the buttermilk, is, prior to kneading operations, reduced to isolated grains which are washed in water, after which the butter is again squeezed for eliminating the remainder of the buttermilk with the washing water.

Preferably, the segregation of the grains of the previously squeezed and ribbon-shaped butter, is ensured by means of a water jet projected under pressure over the entire width of the moving butter ribbon, the pressure and thickness of this jet being all the greater as the desired size of grains is smaller.

According to the present invention, the device comprises an elongated, inclined casing in which two parallel helical screws are mounted for rotation. The casing is provided at its lower end with an inlet opening for the introduction of butter to be squeezed and an outlet opening for the egress of liquids and, at its upper end, with perforated plates for the egress of the kneaded butter. The casing is divided into an upper and a lower compartment by a transverse wall having an aperture located substantially in its middle. The upper compartment, adjacent its lower end, is provided with an outlet opening for egress of water from the upper compartment. A by-pass channel is connected at its inlet end to the aperture in the transverse wall and the outlet end of the by-pass channel opens into the upper compartment at a point beyond the outlet opening for the egress of water from the upper compartment. The inlet end of the by-pass channel is shaped to form a continuous butter ribbon having a substantial width and thickness. A conduit connected with a source of water under pressure is provided with a nozzle located in the by-pass channel immediately adjacent the transverse wall, the nozzle being arranged to project the water substantially perpendicularly against the butter ribbon and over substantially its entire width to divide the butter ribbon into discrete grains carried along the by-pass channel by the water.

A tray is provided at the base of the second compartment for eliminating the washing water and the buttermilk carried along with this water. For preventing this tray from being cluttered by an accumulation of butter, a baffle is provided at the outlet of the by-pass duct, so arranged that the washed butter is brought above the screws, and is re-seized by the latter to be displaced and kneaded at a point beyond the tray in the direction of displacement of the butter through the device.

The excess of washing water is then squeezed out by the operation of the screws in the kneading compartment, and is thus rid of albumen and remnants of milk sugar; it then can be kneaded and pressed through the perforated discs at the end of the apparatus.

It may be noted that the method makes it possible, at the same time, to rapidly cool the butter, at the right moment, by using washing water the desired temperature.

By way of example, there will be described hereinafter, in detail, an example of embodiment of the invention with reference to the appended drawing wherein.

Figure 1:
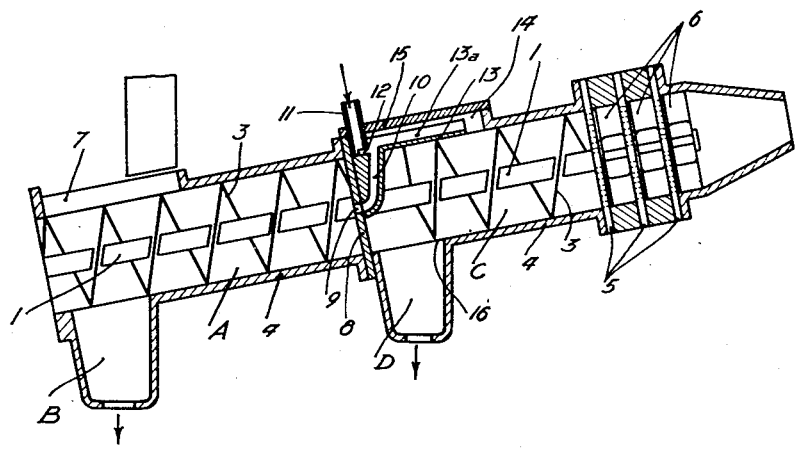
Fig. 1 is a view in axial section of a squeezing-extracting apparatus designed according to the invention.
Figure 2:
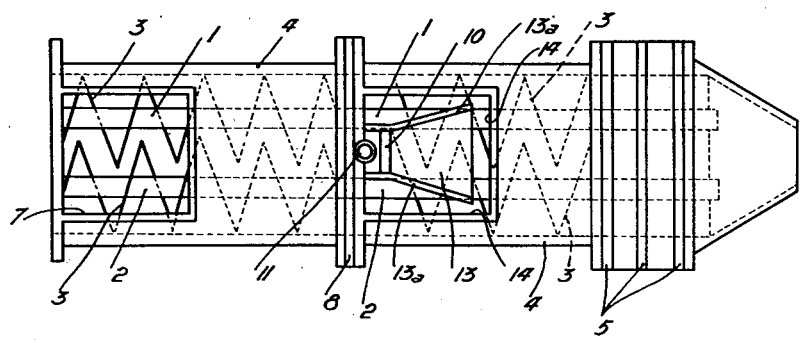
Fig. 2 is a plan view of the same apparatus.

In Figures 1 and 2, each of two main compartments A and C comprise a sump B and D. Two rotary shafts 1 and 2, each carrying a helical screw 3, are arranged in the compartments surrounded by a casing 4. At the end of the compartment C, perforated plates 5 are arranged, between which paddle wheels 6 are arranged on the same shafts 1 and 2. A wide orifice 7 is also provided for the introduction of the butter mixed with buttermilk.

Such are the usual constitutive elements of the squeezing extracting apparatus. An exception must be made, however, for sump D which is generally not necessary. On the contrary, it plays an essential part in the application of the method which is an object of the present invention.

The novel elements which are a characteristic of the present invention consist in a transverse wall 8 comprising a middle aperture 9 to which is connected a by-pass channel 10. Through the casing 4, extends a water-supply tube 11 terminating in a nozzle 12 directed transversely with respect to the channel 10 and flush with the open end of this channel.

This device is completed by a plate 13 provided with side rims 13a and secured to the upper end of the channel 10 substantially in the plane of the wall of the casing 4 having, at that point, a window 14 which allows the butter deposited in fine grains under the action of the water jet to pass onto the plate 13. The window 14 is closed by a cover 15 preventing the outward projection of the water and butter grains. By means of this plate 13, the butter moves on for a short distance above the screws 3 and can fall into the compartment C only beyond the upper edge 16 of the sump D, in the direction of displacement determined by the screws 3. This avoids the accumulation of butter mixed with washing water in this sump and in the zone of the apparatus located immediately above the sump.

The operation of such an apparatus is easily understood when following the path of the butter. As already said, the tank D collects and evacuates the washing waters which the purified butter leaves under the action of screws 3.

What I claim is:

1. A device for squeezing, washing and kneading the butter issuing from a churn, which comprises an elongated, inclined casing in which two parallel helical screws are mounted for rotation, said casing being provided at its lower end with an inlet opening for the introduction of butter to be squeezed and an outlet opening for the egress of liquid and, at its upper end, with perforated plates for the egress of kneaded butter, a transverse wall dividing the casing into an upper and a lower compartment, said transverse wall having an aperture located substantially in its middle, the upper compartment, adjacent its lower end, being provided with an outlet opening for egress of water from the upper compartment, a by-pass channel located in said upper compartment and connected at its inlet end to the aperture in said transverse wall and having its outlet end opening into said upper compartment at a point beyond the outlet opening for the egress of water from said upper compartment, the inlet end of said by-pass channel being shaped to form a continuous butter ribbon having a substantial width and thickness, a conduit connected with a source of water under pressure and provided with a nozzle located in said by-pass channel immediately adjacent said transverse wall, said nozzle being arranged to project the water substantially perpendicularly against the butter ribbon over substantially its entire width and to divide the butter ribbon into discrete grains carried along said by-pass channel by the water.

2. A device for squeezing, washing and kneading the butter issuing from a churn, which comprises an elongated, inclined casing in which two parallel helical screws are mounted for rotation, said casing being provided at its lower end with an inlet opening for the introduction of butter to be squeezed and an outlet opening for the egress of liquid and, at its upper end, with perforated plates for the egress of kneaded butter, a transverse wall dividing the casing into an upper and a lower compartment, said transverse wall having an aperture located substantially in its middle, the upper compartment, adjacent its lower end, being provided with an outlet opening for egress of water from the upper compartment, a chamber located adjacent said transverse wall and projecting upwardly beyond the upper wall of said upper compartment, a cover closing the top of said chamber, a by-pass channel located in said upper compartment and connected at its inlet end to the aperture in said transverse wall, said by-pass channel extending upwardly and having its upper end terminating in said chamber, a plate located in said chamber and connected at one end to the upper end of said by-pass channel, said plate having side rims for retaining on the plate butter grains deposited thereon, said plate having its opposite end spaced from the wall of said chamber to provide a by-pass delivery opening into said upper compartment at a point beyond the outlet opening for the egress of water from said upper compartment, the inlet end of said by-pass channel being shaped to form a continuous butter ribbon having a substantial width and thickness, a conduit connected with a source of water under pressure and provided with a nozzle located in said by-pass channel immediately adjacent said transverse wall, said nozzle being arranged to project the water substantially perpendicularly against the butter ribbon over substantially its entire width and to divide the butter ribbon into discrete grains carried along said by-pass channel and said plate by the water.

References Cited in the file of this patent

UNITED STATES PATENTS

| | | |
|---|---|---|
| 2,395,051 | Horneman et al. | Feb. 19, 1946 |
| 2,466,896 | Horneman et al. | Apr. 12, 1949 |
| 2,536,297 | Lundal et al. | Jan. 2, 1951 |
| 2,564,715 | North | Aug. 21, 1951 |
| 2,617,732 | Thorstensson-Rydberg | Nov. 11, 1952 |
| 2,630,059 | Lundal et al. | Mar. 3, 1953 |
| 2,649,377 | Wilsmann | Aug. 18, 1953 |
| 2,688,468 | Thorstensson-Rydberg | Sept. 7, 1954 |